United States Patent
Goodridge et al.

(10) Patent No.: US 9,996,703 B2
(45) Date of Patent: Jun. 12, 2018

(54) COMPUTER DEVICE AND METHOD FOR CONTROLLING ACCESS TO A RESOURCE VIA A SECURITY SYSTEM

(71) Applicant: Avecto Limited, Manchester (GB)

(72) Inventors: John Goodridge, Manchester (GB); Simon Jonathan Fradkin, Manchester (GB)

(73) Assignee: AVECTO LIMITED, Manchester (GB)

( * ) Notice: Subject to any disclaimer, the term of this patent is extended or adjusted under 35 U.S.C. 154(b) by 174 days.

(21) Appl. No.: 15/158,434

(22) Filed: May 18, 2016

(65) Prior Publication Data
US 2016/0342803 A1 Nov. 24, 2016

(30) Foreign Application Priority Data
May 19, 2015 (GB) .................................. 1508577.2

(51) Int. Cl.
G06F 21/00 (2013.01)
G06F 21/62 (2013.01)

(52) U.S. Cl.
CPC ............................ *G06F 21/6218* (2013.01)

(58) Field of Classification Search
CPC .................................................. G06F 21/6218
See application file for complete search history.

(56) References Cited

U.S. PATENT DOCUMENTS

2014/0033278 A1 1/2014 Nimashakavi et al.
2014/0282919 A1 9/2014 Mason

*Primary Examiner* — Ghodrat Jamshidi
(74) *Attorney, Agent, or Firm* — Knobbe, Martens, Olson & Bear, LLP

(57) ABSTRACT

A computer system 300 contains an agent 303 which modifies the ordinary behaviour of a native security system 103, such as to allow security decisions with alternate granularity or an alternate set of access rights. The agent 303 intercepts authorisation requests made by applications 109 for resources 110 identified by URIs 111 and sends amended requests to the security system 103. An alternate authorisation mechanism 307 of the agent 303 is invoked by the security system 103, whereupon the agent 303 may selectively allow or deny the request according to the originally presented URI 111.

20 Claims, 6 Drawing Sheets

COMPUTER DEVICE AND METHOD FOR CONTROLLING ACCESS TO A RESOURCE VIA A SECURITY SYSTEM

CROSS REFERENCE TO RELATED APPLICATIONS

This application claims priority under 35 U.S.C. § 119 to Application No. 1508577.2 filed May 19, 2015 in United Kingdom, the entire disclosure of which is incorporated by reference herein.

BACKGROUND

Technical Field

The present invention relates generally to the field of computers and computer devices. More particularly, the present invention relates to a computer device and a method for controlling access to a resource in a computer device.

Description of Related Art

A computer device executes applications using a plurality of physical and logical resources, such as system services, drivers, files and settings. Many operating systems provide a security system that controls access to these resources by applying a security model in which access privileges are based on user accounts. An operating system may define privilege levels appropriate to different classes, or groups, of users, and then apply privileges of a relevant class or group to a particular logged-in user. The user is authenticated by logging in to the computer device, and the user, via their previously prepared security account, acts as a security principal in the security model. The security system then authorizes appropriate privileges to the applications, which run in that user's security context. To implement authentication and authorization, the security system typically includes an authentication system and an authorization system that operate together.

The authentication system verifies an identity of an entity (e.g. a user or a service) and may be a precursor to authorization, thereby identifying the entity so as to determine whether that entity should have permission to perform an operation on or with a resource, for example. Alternatively or additionally, the authentication system may produce an audit trail, by logging which entity performed the operation. The authentication system may verify the identity of the user by local user authentication. For example, the user may be authenticated by logging onto the computer device by providing a username and a password. In this way, the user acts as the security principal for the authorization system. Alternatively, in remote user authentication, users are authenticated by the authentication system running on a remote server when performing certain operations. Additionally, the authentication system may verify an authenticity of a remote server by network host authentication.

The authorization system grants permission for the entity to perform a restricted operation on or with the resource. The authorization system enforces access rights for the entity for each application running on the computer device, whereby an application is permitted (or denied) access to each of the resources, consistent with a set of security privileges allocated to the user for that application. For example, if the application is running in an ordinary user's security context, the application is able to read from a particular file, but is not permitted to write to that file. Meanwhile, if the application is running in a local administrator's security context, the application typically has higher privileges, e.g. is able to both read from and write to that file.

It is desirable to implement a least-privilege access security model, whereby each user is granted a minimal set of access privileges which is just sufficient for the user's applications to operate on the computer device. However, many applications require a relatively high privilege level, such as a local administrator level, in order to install and operate correctly. Hence, in practice, there is a widespread tendency to grant additional privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device, leading to errors or corruption within the computer device. Further, a particular application (e.g. an infection or malware) may maliciously access key resources of the computer device with the deliberate intention of subverting security or causing damage.

Therefore, there is a need to provide a mechanism which allows the least-privilege principle to be implemented while still enabling desired, legitimate, applications to execute on the computer device by accessing the relevant resources. In particular, there is a need to enable higher-level access rights, such as local administrator rights, for ordinary users but without compromising security of the computer device.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer device as in claim 1, a method as in claim 11 and a computer-readable storage medium as in claim 20. Additional features of the invention will be apparent from the dependent claims, and the description which follows.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In one example there is described a computer device, comprising: a hardware layer comprising a processor and a memory; an operating system executed by the hardware layer and configured to provide a resource to an application executed on the computer device; a security system configured to control an authorization request from the application for access to the resource, wherein the application is configured to send to the security system the authorization request comprising a first Uniform Resource Identifier (URI) which identifies the resource, and wherein the security system is configured to compare the first URI with a first set of URI authorization rules held by the security system, select a matching first URI authorization rule according to the first URI, execute a first authorization mechanism according to the matching first URI authorization rule, and return an allowed or denied result to the application; and an agent configured to execute in cooperation with the security system, wherein the agent comprises a redirection authorization mechanism and is further configured to: add a redirection rule associated with the redirection authorization mechanism to the first set of URI authorization rules held by the security system; intercept the authorization request containing the first URI sent from the application toward the security system; extract and store the first URI from the intercepted authorisation request; replace the first URI of the intercepted authorization request with a second URI, wherein the second URI matches with the redirection rule; forward the intercepted authorization request, comprising the second URI, to the security system, whereby the security system matches the second URI with the redirection rule and executes the redirection authorization mechanism associated with the redirection rule; selectively allow or deny the authorization request for the resource according to the stored first URI in response to the executed second authorization mechanism; and return the allowed or denied result to the application.

In one example, the agent comprises a second set of URI authorization rules, wherein the second set of URI authorization rules is independent of the first set of URI authorization rules of the security system, and wherein the agent is configured to compare the first URI with the second set of URI authorization rules, select a matching second URI authorization rule according to the first URI and execute a second authorization mechanism according to the matching second URI authorization rule.

In one example, the agent is configured to forward the authorization request, comprising the first URI, to the security system if the second set of URI authorization rules does not comprise a matching URI authorization rule according to the first URI.

In one example, the agent is configured to selectively intercept the authorization request wherein the authorization request is sent from a specific application from amongst a plurality of applications on the computer device.

In one example, the agent is configured to selectively intercept the authorization request wherein the authorization request relates to a specific resource from amongst a plurality of resources of the computer device.

In one example, the agent is configured to intercept a repeated authorization request from the application for access to the resource.

In one example, the agent comprises access rights and wherein the agent is configured to authorize the authorization request according to the access rights.

In one example, the agent is configured to authenticate the authorization request by authenticating a user of the computer device.

In one example, the agent is configured to authenticate the authorization request according to an authentication result from a remote authentication service.

In one example, the agent is configured to authorize the authenticated authorization request according to the access rights.

In one example there is described a method for controlling access to a resource on a computer device, the method being implemented by hardware of the computer device including at least a processor and a memory, the method comprising: operating a security system of the computer device to control authorization requests from applications for resources on the computer device, wherein each authorization request comprises a Uniform Resource Identifier (URI) of a requested resource; providing an agent in cooperation with the security system; adding a redirection rule to a first set of URI authorization rules held by the security system, wherein the added redirection rule identifies a redirection authorization mechanism of the agent; intercepting an authorization request made by an application to request access to the requested resource identified by a first URI; replacing the first URI in the intercepted authorization request with a second URI, wherein the second URI matches the redirection rule; storing the first URI by the agent; forwarding the intercepted authorization request, comprising the second URI, to the security system, whereby the security system matches the second URI with the redirection rule and executes the redirection authorization mechanism associated therewith; selectively allowing or denying the authorization request for the resource according to the stored first URI in response to the executed redirection authorization mechanism; and returning the allowed or denied result to the application.

In one example, the agent comprises a second set of URI authorization rules, wherein the second set of URI authorization rules is independent of the first set of URI authorization rules of the security system, and wherein the method comprises comparing the first URI with the second set of URI authorization rules, selecting a matching second URI authorization rule according to the first URI and executing a second authorization mechanism according to the matching second URI authorization rule.

In one example, the method comprises forwarding the authorization request, comprising the first URI, to the security system if the second set of URI authorization rules does not comprise a matching URI authorization rule according to the first URI.

In one example, the method comprises intercepting the authorization request comprises selectively intercepting the authorization request wherein the authorization request is sent from a specific application from amongst the applications on the computer device.

In one example, the method comprises intercepting the authorization request comprises selectively intercepting the authorization request wherein the authorization request relates to a specific resource from amongst the resources on the computer device.

In one example, the method comprises intercepting a repeated authorization request from the application for access to the resource.

In one example, the agent comprises access rights and wherein the method comprises authorizing the authorization request according to the access rights.

In one example, the method comprises authenticating the authorization request by authenticating a user of the computer device.

In one example, the method comprises authenticating the authorization request according to an authentication result from a remote authentication service.

In one example, the method comprises authorizing the authenticated authorization request according to the access rights.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

At least some of the following example embodiments provide an improved mechanism for controlling access to a resource in a computer device. Advantageously, some of the example embodiments may leverage inherent mechanisms of an existing security system to provide a mechanism for access control to resources. Many other advantages and improvements will be discussed in more detail herein.

Figure 1:
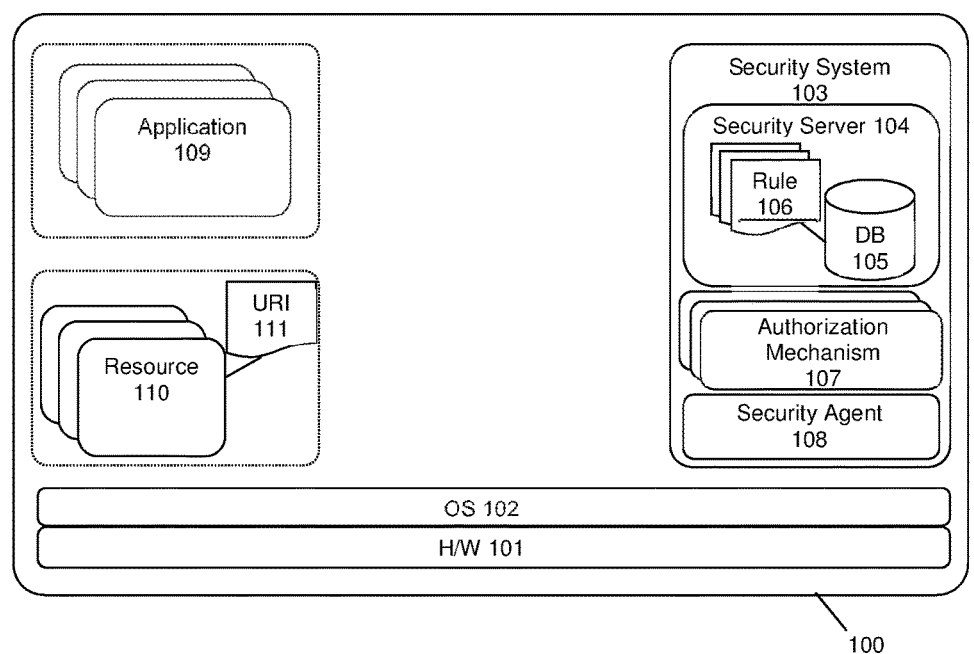
FIG. 1 is a schematic view of an example computer device.

FIG. 1 is a schematic overview of a computer device 100 of a type which may be used in the example embodiments discussed herein. As shown in FIG. 1, the computer device 100 comprises a security system 103 which is configured to control access to a resource 110 from an application 109.

Generally, the computer device 100 includes physical hardware (HW) 101 such as memory, processors (CPUs), I/O interfaces, backbone, power supply and so on. In use, the hardware 101 supports an operating system (OS) 102 that provides a multitude of components, modules and units that together coordinate to provide a runtime environment (RTE) that in turn supports execution of a plurality of applications 109. The example computer device 100 further includes a plurality of resources 110. These resources 110 are the components of the computer device 100 that the plurality of applications 109 may rely upon in order to carry out their execution. For example, the resources 110 may include installed software, system services, drivers, files and/or settings, which may be referred to on different operating systems variously as global, system, device, application, user and/or registry settings. The resources 110 may be identified by Uniform Resource Identifiers (URIs). For example, a URI for changing a date and a time may be 'system.preferences.datetime'. In addition or alternatively, the URIs may identify authentication and/or authorization mechanisms associated with the resources 110. For example, a URI for burning media may be 'system.burn' while another URI for creating, changing or deleting local user accounts and groups may be 'system.identity.write'.

The example embodiments of the present invention will be discussed in detail in relation to computers and computer devices using the 'OS X' operating system provided by Apple Inc. of Cupertino, Calif. USA. However, the teachings, principles and techniques of the present invention are also applicable in other example embodiments. For example, the example embodiments are also applicable to other operating systems, such as UNIX or Linux type operating systems and the Windows™ family of operating systems provided by Microsoft Corporation of Redmond, Wash., USA. In particular, the described examples are useful in many computer devices having a security model which employs discretionary access control.

As shown in FIG. 1, the computer device 100 comprises a security system 103 configured to control access to the resources 110 by applying the security model in which access privileges are based on a user account of a logged on user. The security system 103 comprises a security server 104 that is configured as a daemon to provide an authorization system and may additionally implement other security protocols, such as encryption and decryption. The security server 104 is configured to listen for messages from security APIs and perform services for the security APIs. Typically, the security server 104 may not have a public API. Rather, the application 109 requiring and/or implementing services provided by the security server 104 may call other public calls APIs which in turn communicate with the security server 104. While daemon is a UNIX term, other operating systems provide support for daemons. For example, daemons may be referred to on other operating systems as system agents or services.

The security server 104 further comprises a policy database 105 that contains a set of rules 106 that the security server 104 uses to authorize rights for the user. A rule 106 is a set of attributes that determines if the user should be authorized to perform a privileged operation. A key is a name of a rule 106. The set of rules 106 may be preconfigured when the operating system 102 is installed. Alternatively, the application 109 may modify the set of rules 106. Additionally, a generic rule may be used by the security server 104 for any right not matched with a specific rule. The generic rule has an empty key. The security server 104 is configured to compares the rules 106 with the user's rights and authentication credentials to determine if the user is authorized to perform the privileged operation. Specifically, the security server uses a rule's key to match the rule with a right, in which a right is a named privilege that the application requests on behalf of the user. Hence, rights and rules are named consistently such that they may be matched.

The security system 103 also comprises a security agent 108 (also known as a 'per-user agent'), that is configured to provide an authentication system. Typically, the security agent 108 is configured to provide a dialog to request user credentials such as a username and a password of the user. The username and password require the user to be physically present for authentication, thereby making it more difficult for a malicious user to be authenticated. If the user is authenticated, a credential or token representing the authenticated user is created.

As one example, the Apple 'OS X' family of operating systems is configured to provide authorization through the security server 104. For example, if FileVault 2 (i.e. full-disk encryption) is enabled, the computer device 100 requires a password to decrypt the boot volume. If automatic login is disabled, a login screen is displayed after booting. A login screen may be displayed when the user logs out. The login screen may be displayed when the computer device 100 wakes from sleep or when a screen saver is left. As another example, when the application 109 requests access to a locked keychain, a password is required. If application 109 requires elevated privileges, an administrator password is typically required.

Additionally, some operating systems may provide interfaces which allow other third-party components to participate in authorization decision. For example, the Apple 'OS X' family of operating systems comprises an authorization plug-in API (application programming interface) that enables the creation and deployment of third party plug-ins that may participate in authorization decisions. For example, a third-party plug-in may request a biometric identifier of the user, such as a fingerprint or retinal scan, which may be used to augment, supplement or even replace the authentication system provided by the security agent 108.

Figure 2:
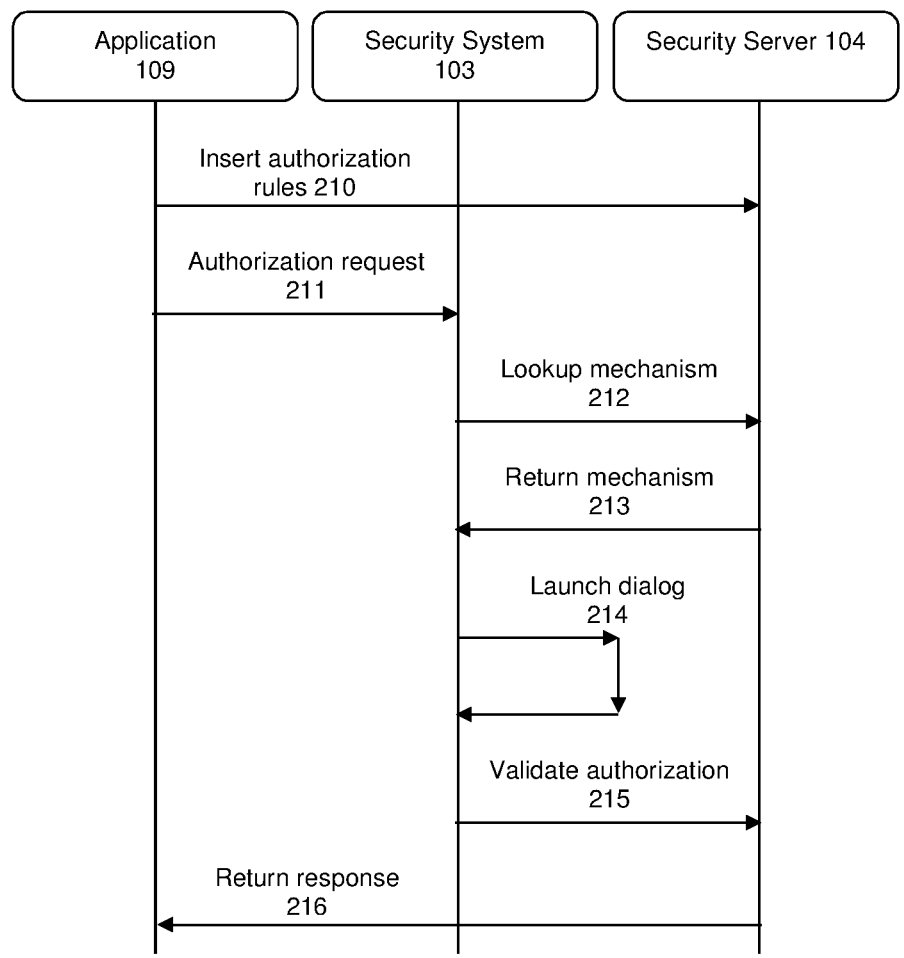
FIG. 2 is a schematic flow diagram of a method of using the computer device.

FIG. 2 is a further schematic view of the computer device 100, including an example mechanism to control access to the resource 110 from the application 109 by authenticating the user and authorizing the request to access the resource 110.

At 210, the application 109 inserts a new rule into the policy database 105, thereby modifying the set of rules 106. The new rule may specify a specific and/or new URI and a new authorization mechanism for that application 109 with respect to a specified resource identified by the new URI. For example, the application 109 may insert the new rule when the application 109 is installed. In this way, the application 109 may extend the default behaviour of the security system 103 by specifying the new authorization mechanism for that specified URI. For example, an alternative biometric authorization mechanism may be specified so as to replace the default login screen. If the application 109 does not insert the new rule, a default rule or the generic rule may instead apply to the new URI, such that a member of an administrator group may be required to authenticate access. As one example, on the Apple 'OS X' family of operating systems, the AuthorizationRightSet function may be called to add or edit the set of rules 106 in the policy database 105. Alternatively, the AuthorizationRightRemove function may be called to delete a selected rule from the set of rules 106 in the policy database 105.

At 211, an authorization session between the application 109 and the security system 103 is initiated by the application 109 requesting access to the resource 110, referred to below as an 'authorization request'. The application 109 identifies the resource 110 by the URI 111. To authorize the user, the security system 103 must also be passed by the application 109 an authorization rights set that contains rights the user requires with respect to the resource 110. By requesting such access, an authorization reference is created, which the security system 103 uses to reference the authorization session. Typically, the authorization reference is passed with every authorization call. In the authorization request, the application 109 may send authorization options to the security system 103, which inform the security system 103 how to handle the authorization request. For example, the authorization options may specify authorization, partial authorization, or pre-authorization and further, may request user authentication.

At 212, the security system 103 passes the URI 111 to the security server 104 which looks up which authorization mechanism 107 is associated with the URI 111, by matching the URI 111 with the set of rules 106 in the policy database 105. If a match is found, the security server uses the matched rule 106 to determine a matched authorization mechanism 107. For example, the matched rule 106 may correspond with the new rule inserted by the application 109 such that the matched authorization mechanism corresponds with the new authorization mechanism associated with the URI 111. However, if no match is found, the default rule will be applied such that a default authorization mechanism is selected as the matched authorization mechanism. The security server 104 then passes back the matched authorization mechanism 107 to the security system 103 at 213.

Next, at step 214, the system invokes the matched authorization mechanism 107 through the security agent 108, thereby in this example launching a dialog that requests the user to provide the username and the password for authentication. If the user is authenticated, a new credential for the authenticated user is created, which may be stored by the security system 103 and used as proof of authenticity. Conversely, if the user is not authenticated, the new credential is not created and the authorization will be denied by default. Alternatively, the user may cancel the authentication dialog, whereby the authorization will also be denied by default.

If the authentication is successful then, at 215, the security system 103 subsequently validates the authorization request by passing the new credential for the authenticated user and the authorization options to the security server 104, along with authorization rights set. The security server 104 uses the rights in the authorization rights set to look up the rules 106 in the policy database 105. The security server 104 uses the credential and the authorization options to determine if the user complies with the rules 106 and whether the user should be granted the rights requested in the authorization rights set for the resource 110 identified by the URI 111.

Finally, the security server 104 returns a result at 216 to the application 109, granting or denying the authorization rights. The application 109 then grants or denies access to the resource according to the returned result. Authorization rights that are granted are not stored in the authorization session. Rather, each time authorization is requested, the security server 104 uses the credential (or re-authenticates the user if the credential has expired) and consults the appropriate rule 106 in the policy database 105 to re-evaluate the authorization.

Resource Access Control

Figure 3:
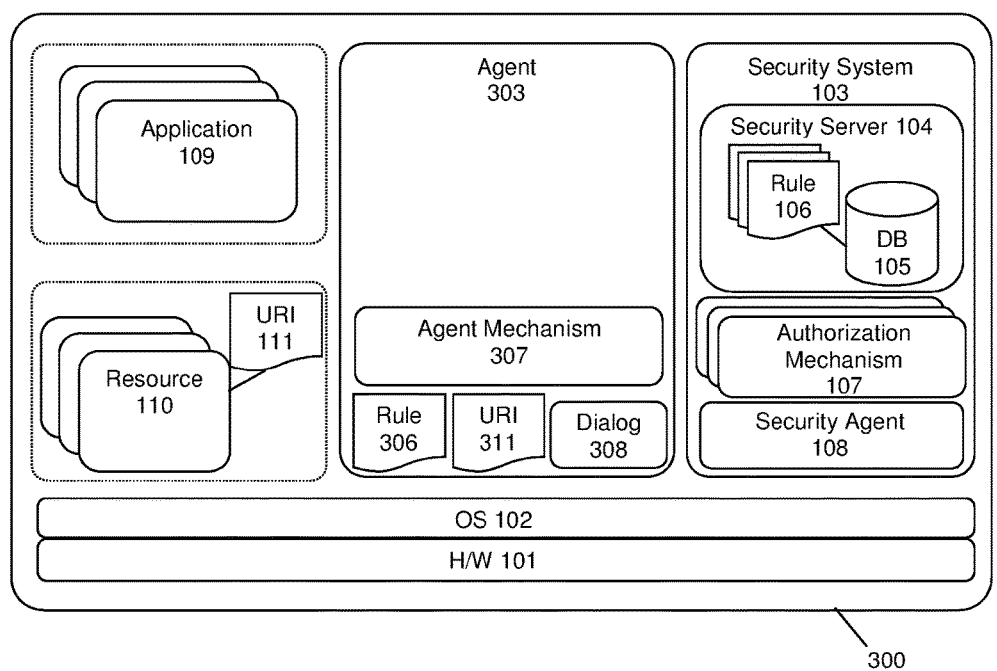
FIG. 3 is a further schematic view of the example computer device.

FIG. 3 is a schematic view of a computer device 300. In this example, the computer device 300 is further adapted in order to better control access to the resource 110. Particularly, the computer device 300 is adapted to allow the least-privilege principle to be implemented while still enabling desired, legitimate, applications to execute on the computer device 300 by accessing the relevant resources. Thus, the computer device 300 is better protected from accidental tampering or malicious attacks of the resource 110 compared with granting additional privilege rights to all members of the relevant user group, and thus allowing access to almost all of the resources of the computer device.

By default, under the normal behaviour of most conventional operating systems, the application 109 would or would not be able to access the resource 110 by authentication and authorization provided by the security system 103, according to the privilege rights of the user. In this embodiment, the computer device 300 further includes an agent 303, which executes in cooperation with the security system 103 and is configured to control the behaviour of the security system 103 by superseding authentication and authorization provided by default by the security system 103. In this way, the agent 303 may selectively permit or deny authorization requests, thereby selectively and securely controlling access to the resource 110 from the application 109 so as to enable higher-level access rights, such as local administrator rights, but without compromising security of the computer device 300.

In one example embodiment, the agent 303 is configured to insert a redirection rule 306 into the policy database 105 of the security server 104, thereby modifying the set of rules 106. Particularly, the redirection rule 306 is configured to match with a new URI, namely an agent URI 311, and a new authorization mechanism, namely a redirection mechanism 307, of the agent 303. By configuring the agent URI 311 to match with the redirection rule 306, the security system 103 may be controlled to invoke the redirection mechanism 307 and thereby, the authorization request may be satisfied by the agent 303 instead of by the native security system 103. That is, in contrast with typical insertion of rules into the policy database 105 that may extend the default behaviour of the security system 103 as described previously, the redirection rule 306 and the agent URI 311 together allow the agent 303 to control and augment the behaviour of the underlying native security system 103.

Generally, an operation of the computer device 300 may be modified by intercepting function calls or messages or events related to the operation. For example, a response or functionality of the security system 103 related to the resource 110 may be modified by intercepting (or hooking) function calls of the security system 103 or messages or events related to the resource 110 e.g. the authorization request from the application 109.

In one example embodiment, the agent 303 is configured to selectively intercept the authorization request for the resource 110 sent by the application 109 to the authorization system 103. For example, the agent 303 may be configured to intercept the authorization request from a specific application 109 and/or related to a specific resource 110. Conversely, the agent 303 may be configured to not intercept (i.e. ignore) the authorization request from another specific application 109 and/or related to another specific resource 110. Further, the agent 303 is configured modify the intercepted authorization request. Specifically, the agent 303 is configured to replace the URI 111 passed by the application 109 to the authorization system 103 with the agent URI 311. The agent 303 is further configured to forward the intercepted authorization request for the resource 110, comprising the agent URI 311, to the security system 103. Hence, the agent 303 controls the security system 103 to handle the intercepted authorization request for the resource 110 according to the agent URI 311, rather than according to the original URI 111, as described previously. Additionally, the agent 303 is configured to store the replaced URI 111.

Furthermore, agent 303 is configured to control the authorization request for the resource 110 according to the stored URI 111. In this way, the agent 303 may control the behaviour of the security system 103. Particularly, the redirection mechanism 307 is configured to supersede the default authorization mechanism 107 by redirecting control of the authorization request from the security system 103 to the agent 303. In addition, the agent 303 comprises an agent authentication system 308, configured to authenticate the user, in which user authentication may comprise, for example, the username and the password, null authentication (i.e. do nothing), a challenge response, a gated access or integration with an external service (e.g. a remote authentication service such as a web-based help desk to install new applications). In this way, the agent authentication system 308 may supersede the default security agent 108 of the security system 103. Hence, the agent 303 is configured to selectively allow or deny the authorization request for the resource 110 according to the stored URI 111 and authentication performed by the agent authentication system 308. Particularly, the agent 303 may be configured to store and use access rights assigned to specific users and/or specific user groups for specific applications and/or specific resources. For example, the agent 303 may comprise an access control list which may be configured independently from any access control list employed by the security system 103. For example, the agent 303 may be configured to store higher-level access rights than would otherwise be assigned by default to the user. Alternatively or additionally, the agent 303 may be configured to store lower-level access rights than would otherwise be assigned by default to the user. Additionally, the agent 303 is configured to return an allowed or denied result for the authorization request for the resource 110 to the application 109. The agent 303 may be configured to further return a cancelled result, in an event that the authorization request is cancelled e.g. user authentication is cancelled.

Figure 4:
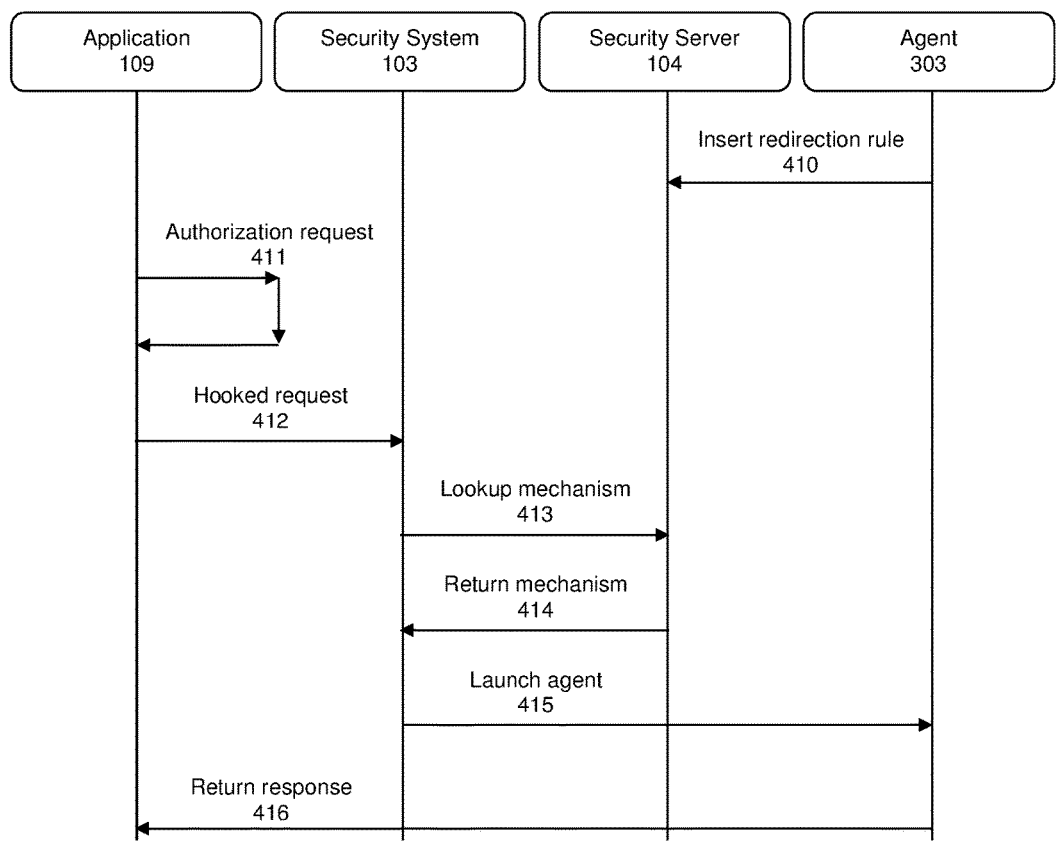
FIG. 4 is a schematic flow diagram of a method of using the computer device.

FIG. 4 is a further schematic view of the computer device 300, including an example mechanism to control access to the resource 110 from the application 109 in which the agent 303 controls the security system 103. In this way, the agent 303 may selectively permit or deny authorization requests, thereby enabling higher-level access rights to be selectively assigned to specific users and/or specific user groups for specific applications and/or specific resources, without risking accidental damage to or compromising security of the computer device 300.

At 410, the agent 303 inserts the new rule into the policy database 105, as described previously. At 411, the authorization session between the application 109 and the security system 103 is initiated by the application 109 requesting access to the resource 110. In contrast with the normal default behaviour, however, the agent 303 intercepts the authorization request and replaces the requested resource URI 111 instead with the agent URI 311. The agent 303 then forwards the intercepted authorization request, now comprising the agent URI 311, to the security system 103 at 412 and stores the replaced URI 111.

At 413, the security system 103 passes the agent URI 311, instead of the URI 111 as would be passed by default, to the security server 104. The security server 104 matches the agent URI 311 with the matching redirection mechanism 307, which has been previously registered with the security server 104 by the agent 303. Hence, the security server 104 returns the redirection mechanism 307 to the security system 103 at 414, rather than the authorization mechanism 107 that would otherwise match URI 111, as described previously.

Hence, at 415, the security system 103 invokes the matched redirection mechanism 307, thereby launching the agent 303. In this way, the agent 303 may satisfy the authorization request by authenticating the user and/or authorizing the authorization request, according to the higher-level access rights selectively assigned to the user for specific applications e.g. application 109 and/or specific resources e.g. resource 110, in which these access rights may be stored by the agent 303. For example, the agent 303 may launch a dialog that requests the user to provide the username and the password for authentication. If the user is authenticated, the new credential for the authenticated user is created, which may be stored by the agent 303 and used as proof of authenticity. Hence, the agent 303 may validate the authorization request according to the credential for the authenticated user and the authorization rights set. Particularly, the agent 303 may use the credential and the authorization options to determine if the user complies with the rule 106 and whether the user should be granted the rights requested in the authorization rights set for the resource 110 identified by the URI 111 according to the to the higher-level access rights selectively assigned to the user.

Finally, the agent 303 returns the result to the application 109, granting or denying the authorization request at step 416. As with the default behaviour, authorization rights that are granted are not stored in the authorization session i.e the authorization rights are not persistent. Rather, each time authorization is requested e.g. a repeated authorization request from the application for access to the resource, the agent 303 intercepts the authorization request and handles the intercepted authorization request, as described above.

In this example, the computer device 300 contains the agent 303 which modifies the ordinary behaviour of the native security system 103, such as to allow security decisions with alternate granularity or with an alternate set of access rights. The agent 303 intercepts authorisation requests made by the applications 109 for the resources 110 as identified by the first URIs 111. An amended authorisation request is sent to the security system 103, which redirects to the alternate authorisation mechanism 307 of the agent 303. This alternate authorisation mechanism 307 is thus executed by the security system 103, whereupon the agent 303 may at that stage decide to selectively allow or deny the request, by now considering the originally presented URI 111 as extracted from the original authorisation request and stored by the agent 303 ready for this later determination stage.

Figure 5:
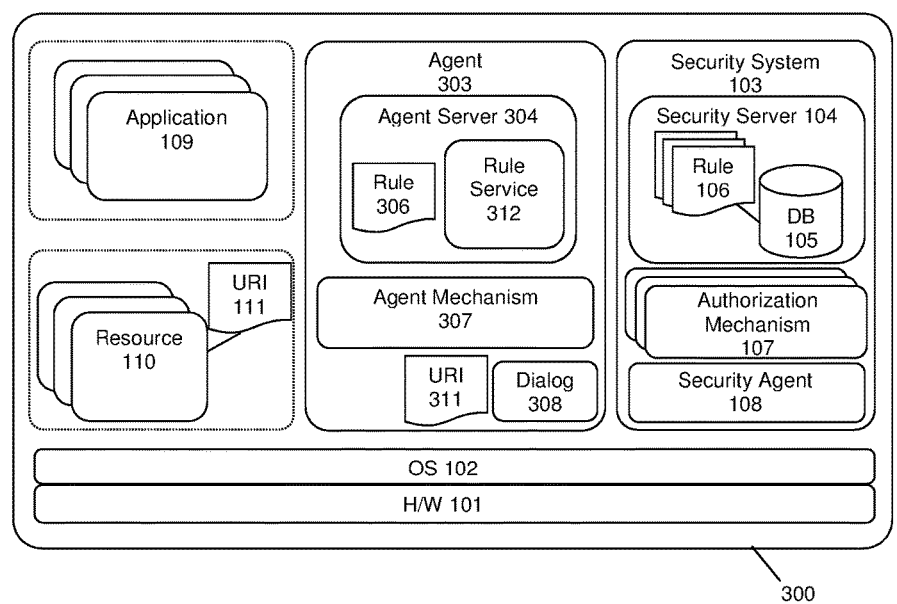
FIG. 5 is a further schematic view of the example computer device.

Interestingly, the computer device 300 of the example embodiments still provides a satisfactory user experience in terms of accessing resources. Particularly, higher-level access rights may be granted selectively to a specific user or a specific user group in certain circumstances, while otherwise implementing the least-privilege principle of resource access control. At the same time, this controlled access to the resources prevents the possibility of accidental tampering with the computer device 300 and maintains security and isolation of potentially malicious code by being able to deny or restrict potentially insecure resource operations FIG. 5 is a further schematic view of the computer device 300 in more detail. In this example, the computer device 300 is configured to implement additional authorization refinements, which provide enhanced control over access to the resource 110, according to the authorization rights set that contains the rights the user requires with respect to the resource 110 and the rule 106.

Particularly, the agent 303 may further comprise an agent server 304 that may be configured as a daemon to provide authorization services to the agent 303. Like the security server 104 of the default authorization system, the agent server 304 may also be configured to listen for messages, though in this case from the agent 303.

The agent server 304 may further comprise a rule service 312 that the agent server 304 may use to authorize rights for the user. The agent server 304 may further comprise the redirection rule 306 that may be inserted into the policy database 105 of the security server 104, as described previously. Additionally, the agent server 304 may further comprise a set of agent rules in an agent policy database, similar to the set of rules 106 in the policy database 105 of the security server 104, though the agent rules may be configured independently from the set of rules 106 in the policy database 105 of the security server 104. In this way, the agent 303 may select a different authorization mechanism compared with that which would be otherwise selected by the security server 104 for a given URI.

In one example, the agent 303 is configured to receive the authorization request from the security system 103, in which the authorization request comprises the agent URI 311. Particularly, the security system 103 is controlled to forward the authorization request to the agent 303 because the agent 303 is configured to previously replace the URI 111 with the agent URI 311, thereby directing the security system 103 to forward the authorization request to the agent 303. In response to receiving the authorization request from the security system 103, the agent 303 is configured to again replace the agent URI 311 in the authorization request with the stored URI 111. Further, the agent 303 may be configured to forward the authorization request to the agent server 304, in which the authorization request now comprises the original URI 111. In response, the agent server 304 may be configured to evaluate the authorization request by requesting the rule service 312 to evaluate the URI 111 of the authorization request against the agent rules so as to determine an action to be taken for the authorization request. The rule service 312 is configured to return a rule evaluation response to the agent server 304, according to which the agent server 304 is configured to take the determined action for the authorization request. For example, the agent 304 may be configured to request a challenge response code or the username and the password from the user through the agent authentication system 308, in which the agent authentication system 308 may be configured to display a challenge response code dialog or a user credentials dialog for the user name and user password. The agent server 304 may be further configured to verify a result of authentication returned to the agent server 304 by the agent authentication system 308 and to notify the security system 103 of the verified result.

In the event that the intercepted authorization request evaluated by the rule service 312 against the agent rules, so as to determine the action to be taken for the authorization request, does not match an agent rule, the agent server 304 may be configured to notify the agent 303 of such. In response to such an unmatched authorization request, the agent 303 may be configured to forward the authentication request to the security system 103, in which the authentication request comprises now the URI 111, rather than the agent URI 311 as previously passed by the agent 303 to the security system 103. In this way, the default behaviour of the security system 103 for this unmatched authorization request may be restored.

Figure 6:
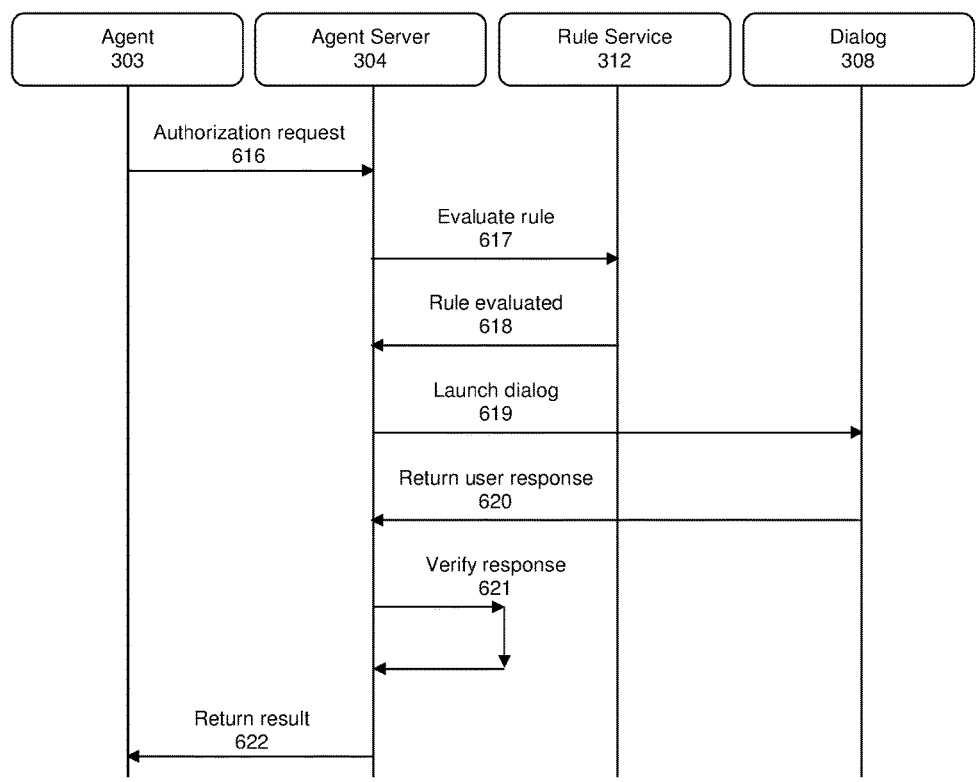
FIG. 6 is a schematic flow diagram of a method of using the computer device.

FIG. 6 is a further schematic view of an operation of the computer device 300 in more detail, including an example mechanism to control access to the resource 110 from the application 109 in which the agent 303 may selectively permit or deny authorization requests, so as to enable higher-level access rights without compromising security of the computer device 300.

Particularly, when the agent 303 is invoked by the security system 103 as directed by the agent URI 311 and as described previously, the agent 303 may replace the agent URI 311 in the authorization request with the stored URI 111 and forward the authorization request to the agent server 304, as at step 616. In turn at 617, the agent server 304 may evaluate the authorization request by requesting the rule service 312 to evaluate the URI 111 of the authorization request against the agent rules so as to determine the action to be taken for the authorization request. The rule service 312 may return at 618 the rule evaluation response to the agent server 304. In this example, the agent server 304 may take the determined action for the authorization request by invoking the agent authentication system 308 at 619, which may display the user credentials dialog. The result of authentication may be returned at 620 by the agent authentication system 308 to the agent server 304, which may verify the result at 621 and return the verified result to the agent 303 at 622. Subsequently, the agent 303 notifies the security system 103 of the verified result, as described previously.

In summary, by default the least-privilege principle of resource access control restricts access to resources on the computer device 100. However, since in practice there is a widespread tendency to grant additional privilege rights to all members of a relevant user group, there is the possibility of accidental tampering with the computer device 100 or malware may maliciously access key resources of the computer device 100. In contrast, the computer device 300 further includes the agent 303 configured to control, rather than merely extend, the default behaviour of the security system by superseding authentication and/or authorization provided by default by the security system 103. In this way, the agent 303 may selectively permit or deny authorization requests, thereby selectively and securely controlling access to the resources 110 from the applications 109 so as to enable higher-level access rights, such as local administrator rights, but without compromising security of the computer device 300. Particularly, higher-level access rights may be selectively granted to specific users or specific user groups, while otherwise implementing the least-privilege principle of resource access control. At the same time, this controlled access to the resources prevents the possibility of accidental tampering with the computer device 300 and maintains security and isolation of potentially malicious code by being able to deny or restrict potentially insecure resource operations.

In summary, the example embodiments have described an improved mechanism to control access to a resource of a computer device. The industrial application of the example embodiments will be clear from the discussion herein.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A computer device comprising:
a hardware processor; and
a memory,
wherein the hardware processor causes the computer device to:
execute an operating system that provides a resource to an application, and
control an authorization request from the application to a security system of the operating system for access to the resource,
wherein the application is configured to send the authorization request comprising a first Uniform Resource Identifier (URI) which identifies the resource, and wherein the security system is configured to compare the first URI with a first set of URI authorization rules held by the security system, select a matching first URI authorization rule according to the first URI, execute a first authorization mechanism according to the matching first URI authorization rule, and return an allowed or denied result to the application; and
execute an agent in cooperation with the security system, wherein the agent comprises a redirection authorization mechanism and is further configured to:
add a redirection rule associated with the redirection authorization mechanism to the first set of URI authorization rules held by the security system;
intercept the authorization request containing the first URI sent from the application toward the security system;
extract and store the first URI from the intercepted authorization request;
replace the first URI of the intercepted authorization request with a second URI, wherein the second URI matches with the redirection rule;
forward the intercepted authorization request, comprising the second URI, to the security system, whereby the security system matches the second URI with the redirection rule and executes the redirection authorization mechanism associated with the redirection rule;
selectively allow or deny the authorization request for the resource according to the stored first URI in response to executing a second authorization mechanism; and
return the allowed or denied result to the application.

2. The computer device according to claim 1, wherein the agent comprises a second set of URI authorization rules, wherein the second set of URI authorization rules is independent of the first set of URI authorization rules of the security system, and wherein the agent is configured to compare the first URI with the second set of URI authorization rules, select a matching second URI authorization rule according to the first URI and execute a second authorization mechanism according to the matching second URI authorization rule.

3. The computer device according to claim 2, wherein the agent is configured to forward the authorization request, comprising the first URI, to the security system when the second set of URI authorization rules does not comprise a matching URI authorization rule according to the first URI.

4. The computer device according to claim 1, wherein the agent is configured to selectively intercept the authorization request wherein the authorization request is sent from a specific application from amongst a plurality of applications on the computer device.

5. The computer device according to claim 1, wherein the agent is configured to selectively intercept the authorization request wherein the authorization request relates to a specific resource from amongst a plurality of resources of the computer device.

6. The computer device according to claim 1, wherein the agent is configured to intercept a repeated authorization request from the application for access to the resource.

7. The computer device according to claim 1, wherein the agent comprises access rights and wherein the agent is configured to authorize the authorization request according to the access rights.

8. The computer device according to claim 7, wherein the agent is configured to authenticate the authorization request by authenticating a user of the computer device.

9. The computer device according to claim 7, wherein the agent is configured to authenticate the authorization request according to an authentication result from a remote authentication service.

10. A method for controlling access to a resource on a computer device, the method being implemented by hardware of the computer device including at least a processor and a memory, the method comprising:
operating a security system of the computer device to control authorization requests from applications for resources on the computer device, wherein each authorization request comprises a Uniform Resource Identifier (URI) of a requested resource;
providing an agent in cooperation with the security system;
adding a redirection rule to a first set of URI authorization rules held by the security system, wherein the added redirection rule identifies a redirection authorization mechanism of the agent;
intercepting an authorization request made by an application to request access to the requested resource identified by a first URI;
replacing the first URI in the intercepted authorization request with a second URI, wherein the second URI matches the redirection rule;
storing the first URI by the agent;
forwarding the intercepted authorization request, comprising the second URI, to the security system, whereby the security system matches the second URI with the redirection rule and executes the redirection authorization mechanism associated therewith;
selectively allowing or denying the authorization request for the resource according to the stored first URI in response to the executed redirection authorization mechanism; and
returning the allowed or denied result to the application.

11. The method according to claim 10, wherein the agent comprises a second set of URI authorization rules, wherein the second set of URI authorization rules is independent of the first set of URI authorization rules of the security system, and wherein the method comprises comparing the first URI with the second set of URI authorization rules, selecting a matching second URI authorization rule according to the first URI and executing a second authorization mechanism according to the matching second URI authorization rule.

12. The method according to claim 11, wherein the method comprises forwarding the authorization request, comprising the first URI, to the security system when the second set of URI authorization rules does not comprise a matching URI authorization rule according to the first URI.

13. The method according to claim 11, wherein intercepting the authorization request comprises selectively intercepting the authorization request wherein the authorization request is sent from a specific application from amongst the applications on the computer device.

14. The method according to claim 10, wherein intercepting the authorization request comprises selectively intercepting the authorization request wherein the authorization request relates to a specific resource from amongst the resources on the computer device.

15. The method according to claim 10, wherein the method comprises intercepting a repeated authorization request from the application for access to the resource.

16. The method according to claim 10, wherein the agent comprises access rights and wherein the method comprises authorizing the authorization request according to the access rights.

17. The method according to claim 16, wherein the method comprises authenticating the authorization request by authenticating a user of the computer device.

18. The method according to claim 16, wherein the method comprises authenticating the authorization request according to an authentication result from a remote authentication service.

19. The method according to claim 18, wherein the method comprises authorizing the authenticated authorization request according to the access rights.

20. A non-transitory computer readable storage medium having recorded thereon instructions which, when implemented by a computer device, cause the computer device to perform operations comprising:
operating a security system of the computer device to control authorization requests from applications for resources on the computer device, wherein each authorization request comprises a Uniform Resource Identifier (URI) of a requested resource;
providing an agent in cooperation with the security system;
adding a redirection rule to a first set of URI authorization rules held by the security system, wherein the added redirection rule identifies a redirection authorization mechanism of the agent;
intercepting an authorization request made by an application to request access to the requested resource identified by a first URI;
replacing the first URI in the intercepted authorization request with a second URI, wherein the second URI matches the redirection rule;
storing the first URI by the agent;
forwarding the intercepted authorization request, comprising the second URI, to the security system, whereby the security system matches the second URI with the redirection rule and executes the redirection authorization mechanism associated therewith;
selectively allowing or denying the authorization request for the resource according to the stored first URI in response to the executed redirection authorization mechanism; and
returning the allowed or denied result to the application.

* * * * *